United States Patent
Soled et al.

(10) Patent No.: US 7,648,941 B2
(45) Date of Patent: Jan. 19, 2010

(54) BULK BIMETALLIC CATALYSTS, METHOD OF MAKING BULK BIMETALLIC CATALYSTS AND HYDROPROCESSING USING BULK BIMETALLIC CATALYSTS

(75) Inventors: Stuart L. Soled, Pittstown, NJ (US); Sabato Miseo, Pittstown, NJ (US); Sonja Eijsbouts, Nieuwkuijk (NL); Frans L. Plantenga, Hoevelaken (NL)

(73) Assignee: ExxonMobil Research and Engineering Company, Annandale, NJ (US)

( * ) Notice: Subject to any disclaimer, the term of this patent is extended or adjusted under 35 U.S.C. 154(b) by 240 days.

(21) Appl. No.: 11/586,399

(22) Filed: Oct. 25, 2006

(65) Prior Publication Data
US 2007/0084754 A1 Apr. 19, 2007

Related U.S. Application Data

(63) Continuation-in-part of application No. 11/227,726, filed on Sep. 14, 2005.

(60) Provisional application No. 60/730,282, filed on Oct. 26, 2005, provisional application No. 60/612,110, filed on Sep. 22, 2004.

(51) Int. Cl.
*B01J 23/00* (2006.01)
*C10G 47/00* (2006.01)
*C10G 49/04* (2006.01)

(52) U.S. Cl. ............... 502/315; 502/102; 502/103; 502/104; 502/107; 502/113; 502/117; 502/300; 502/305; 502/311; 502/313

(58) Field of Classification Search ............... 502/102, 502/103, 104, 107, 113, 117, 300, 305, 311, 502/313, 315; 208/107, 108, 111.3, 111.35, 208/112, 143
See application file for complete search history.

(56) References Cited

U.S. PATENT DOCUMENTS

| 2,642,463 | A |   | 6/1953  | Arnold et al. |
|-----------|---|---|---------|---------------|
| 3,779,903 | A |   | 12/1973 | Levinson |
| 3,929,467 | A | * | 12/1975 | Davies et al. ............... 75/585 |
| 4,596,785 | A | * | 6/1986  | Toulhoat et al. ............ 502/220 |
| 6,071,402 | A | * | 6/2000  | Danot et al. ............... 208/112 |
| 6,136,180 | A | * | 10/2000 | Benazzi et al. ............. 208/122 |
| 6,325,920 | B1| * | 12/2001 | Brun et al. ............... 208/216 R |
| 6,503,864 | B2| * | 1/2003  | Loescher et al. ............ 502/216 |
| 6,733,657 | B2| * | 5/2004  | Benazzi et al. ............. 208/110 |
| 7,270,738 | B2| * | 9/2007  | Euzen et al. ............. 208/111.3 |
| 2002/0132731 | A1 | * | 9/2002 | Loescher et al. ........... 502/216 |
| 2002/0160911 | A1 | * | 10/2002 | Benazzi et al. ............ 502/240 |
| 2003/0102254 | A1 | * | 6/2003 | Eijsbouts et al. ........ 208/216 R |
| 2004/0138059 | A1 | * | 7/2004 | Euzen et al. ............... 502/255 |
| 2004/0182749 | A1 | * | 9/2004 | Domokos et al. ........... 208/213 |
| 2005/0236302 | A1 |   | 10/2005 | Soled et al. |
| 2005/0236304 | A1 |   | 10/2005 | Soled et al. |

FOREIGN PATENT DOCUMENTS

| WO | WO 00/41810      | 7/2000  |
| WO | WO 2005/103206 A1 | 11/2005 |
| WO | WO 2005/105958   | 11/2005 |

* cited by examiner

*Primary Examiner*—Walter D Griffin
*Assistant Examiner*—Huy-Tram Nguyen
(74) *Attorney, Agent, or Firm*—David M. Weisberg

(57) ABSTRACT

The invention relates to a process for upgrading hydrocarbonaceous feedstreams by hydroprocessing using bulk bimetallic catalysts. More particularly, the invention relates to a catalytic hydrotreating process for the removal of sulfur and nitrogen from a hydrocarbon feed such as a fuel or a lubricating oil feed. The catalyst is a bulk catalyst comprising a Group VIII metal and a Group VIB metal.

21 Claims, No Drawings

BULK BIMETALLIC CATALYSTS, METHOD OF MAKING BULK BIMETALLIC CATALYSTS AND HYDROPROCESSING USING BULK BIMETALLIC CATALYSTS

RELATED APPLICATIONS

This application claims the benefit of U.S. Provisional Application No. 60/730,282 filed of Oct. 26, 2005. This application is also a Continuation-In-Part of U.S. application Ser. No. 11/227,726 filed Sep. 14, 2005, which claims priority from U.S. Application No. 60/612,110 filed Sep. 22, 2004.

FIELD OF THE INVENTION

The invention relates to a process for upgrading hydrocarbonaceous feedstreams by hydroprocessing using bulk bimetallic catalysts. More particularly, the invention relates to a catalytic hydrotreating process for the removal of sulfur and nitrogen from a hydrocarbon feed such as a feed to a fuel process or a feed to a lubricating oil process. The catalyst is a bulk catalyst containing a Group VIII metal and a Group VIB metal.

BACKGROUND OF THE INVENTION

Increasing regulatory and operational pressure has resulted in the need for hydrocarbons that have low sulfur levels and nitrogen levels. Hydroprocessing, which involves treating a hydrocarbon with hydrogen in the presence of a catalyst, is a conventional method for heteroatom (e.g., sulfur and nitrogen) removal.

Conventional hydroprocessing (i.e., known to those skilled in the art of hydrocarbon upgrading) catalysts generally contain a Group VIB metal with one or more Group VIII metals on a refractory support. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization, while nickel promoted molybdenum on alumina catalysts are the most widely used for hydrodenitrogenation, partial aromatic saturation, as well as hydrodesulfurization.

One example of the use of a supported bimetallic hydroprocessing catalyst is disclosed in GB 820536, which describes a process for the manufacture of mechanically strong supported catalyst particles comprising combinations of cobalt, nickel, molybdenum, vanadium or tungsten. The patent discloses a nickel tungsten supported catalyst obtained by extruding a wet cake comprising 83 wt % support material and 17 wt % of metals compounds followed by calcination at 566° C. Similarly, Russian patent publication RU 2114696 describes a nickel tungsten bimetallic supported catalyst made by mixing basic nickel carbonate, tungstic acid and more than 40 wt % of a carrier material comprising a special carrier of dry alumina gel and aluminum hydroxide, extruding the mixture, drying and calcining at 350 to 450° C. In addition to supported catalysts, hydroprocessing using bulk bimetallic catalysts (also referred to as "unsupported" catalysts) is also known. However, their hydroprocessing performance is generally inferior to the bulk trimetallic catalysts comprising two instead of only one group VIB metals.

For example, WO 00/41810 discloses bulk bi- and trimetallic hydroprocessing catalysts. Where the trimetallic bulk catalysts have a significantly higher catalytic activity than a bimetallic bulk catalyst prepared in a similar way in a comparison where the feed contained sulfur but no nitrogen. WO 99/03578 is similar in that a bulk trimetallic catalyst exhibits greater hydroprocessing effectiveness over a bulk bimetallic catalyst. Another example of a bulk trimetallic catalyst out-performing a similarly prepared bimetallic catalyst is disclosed in WO 00/41811.

Recently, bimetallic bulk catalysts of reduced crystallinity have been described in WO 2004/073859. The catalysts, bulk metal oxide catalysts comprising one or more metals of group VIII and one or more metals of group VIb in their oxide or sulphide form and a refractory oxide, are prepared by controlled precipitation of metal compounds, refractory oxide material and alkali compound (preferably ammonia) in a protic liquid, forming an ammonium complex of the metal and refractory oxide materials which is subsequently heated. Similarly, WO 2005/005582 describes the use of a bimetallic Group VIB/Group VIII catalyst to prepare lubricating base oil. The bulk catalysts are made by reacting one solid compound comprising the group VIII metal and one solute compound comprising the group VIB metal in the presence of the refractory metal after addition of ammonium solution. The catalyst is amorphous as described by XRD analysis.

There is, therefore, still a need for bulk bimetallic hydroprocessing catalysts that are at least as effective for hydrocarbon hydroprocessing as bulk trimetallic catalysts.

SUMMARY OF THE INVENTION

The invention relates to a bulk catalyst comprising nickel tungsten metal oxidic particles, wherein the bulk catalyst has been prepared by a process comprising
  (i) forming a slurry of a first solid metal compound comprising Group VIII metal nickel and a second solid metal compound comprising Group VIB metal tungsten in a protic liquid, the slurry further comprising less than about 10 mole % of a second Group VIB metal (relative to the total amount of Group VIB metals) and less than about 10 mole % of a Group V metal (relative to the total of the Group VIB metals),
  (ii) reacting the first and second solid metal compounds at elevated temperature and under conditions sufficient to form the nickel tungsten metal oxidic particles, whereby the first and second solid metal compounds remain at least partly in the solid state during the entire reaction.

The invention also relates to a process for the manufacture of a bulk catalyst comprising nickel tungsten metal oxidic particles, the process comprising
  (i) forming a slurry of a first solid metal compound comprising Group VIII metal nickel and a second solid metal compound comprising Group VIB metal tungsten in a protic liquid, the slurry further comprising less than about 10 mole % of a second Group VIB metal (relative to the total amount of Group VIB metals) and less than about 10 mole % of a Group V metal (relative to the total of the Group VIB metals),
  (ii) reacting the first and second solid metal compounds at elevated temperature and under conditions sufficient to form the nickel tungsten metal oxidic particles, whereby the first and second solid metal compounds remain at least partly in the solid state during the entire reaction.

Optionally, the catalyst manufacturing process of the invention, further comprises one or more of the following process steps:
  (iii) separating the metal oxidic particles from the slurry;
  (iv) compositing with 0 to 40 wt % relative to the total weight of the bulk catalyst of one or more materials selected from the group of binder materials, conventional hydroprocessing catalysts and cracking compounds before, during or after the combining and/or reacting of the metal compounds;

(v) spray-drying, (flash) drying, milling, kneading, slurry-mixing, dry or wet mixing, or combinations thereof;

(vi) shaping;

(vii) drying and/or thermally treating at a temperature below a temperature where transition to a crystalline structure occurs, preferably below about 350° C. and (viii) sulfiding.

The invention also relates to hydroprocessing a hydrocarbon feed by a process comprising contacting the feed with hydrogen in the presence of a catalytically effective amount of a bulk catalyst under catalytic conversion conditions, the bulk catalyst comprising a Group VIII metal and a Group VIB metal, wherein the catalyst is not an amorphous catalyst and provided that when the Group VIB metal is tungsten the feed contains both sulfur and nitrogen. The term "not amorphous" means that at least one crystalline phase is present, even if one or more disordered phases is also present in the catalyst.

In another embodiment, the invention relates to hydroprocessing a hydrocarbon feed by a process comprising contacting the feed with hydrogen in the presence of a catalytically effective amount of a bulk catalyst under catalytic conversion conditions, the bulk catalyst comprising nickel and tungsten, wherein the feed contains both sulfur and nitrogen. In a preferred embodiment, the hydroprocessing includes ultra-deep hydrodesulfurization of the feed, more preferably at a hydroprocessing pressure of at least 20 bar. In another preferred embodiment, the bulk catalyst is used in a process for the hydrodesulfurization and hydrodenitrogenation pre-treatment of a hydrocracking feed stream, or in a process for the manufacture of a lubricating oil.

In another embodiment, the invention relates to hydroprocessing a hydrocarbon feed by a process comprising contacting the feed with hydrogen in the presence of a catalytically effective amount of a bulk catalyst under catalytic conversion conditions, the bulk catalyst comprising a Group VIII metal and a Group VIB metal, wherein the catalyst is not an amorphous catalyst and provided that when the Group VIB metal is tungsten, the catalyst has been maintained at a temperature lower than 400° C. from synthesis until contacting the feed and hydrogen under catalytic hydroprocessing conditions.

In another embodiment, the invention relates to hydroprocessing a hydrocarbon feed by a process comprising contacting the feed with hydrogen in the presence of a catalytically effective amount of a bulk catalyst under catalytic conversion conditions, the bulk catalyst comprising a Group VIII metal and a Group VIB metal, wherein the catalyst is not an amorphous catalyst and provided that when the Group VIB metal is tungsten, the catalyst is synthesized from first and the second solid metal compounds which both remain at least partly in the solid state during catalyst synthesis.

In another embodiment, the invention relates to hydroprocessing a hydrocarbon feed by a process comprising contacting the feed with hydrogen in the presence of a catalytically effective amount of a bulk catalyst under catalytic conversion conditions, the bulk catalyst comprising a Group VIII metal and a Group VIB metal, wherein the catalyst is not an amorphous catalyst and provided that when the Group VIB metal is tungsten, the catalyst is a nickel tungsten bulk metallic catalyst having a nickel to tungsten mole ratio of less than 1.5.

In another embodiment, the process further comprises removing a hydrocarbon product from the process, the hydrocarbon product containing less nitrogen, less sulfur, or less sulfur and less nitrogen than the hydrocarbon feed. In a preferred embodiment, the feed is a hydrocarbon oil containing sulfur and nitrogen, and the hydrocarbon product contains less than about 30 ppm sulfur, more preferably less than 10 ppm sulfur. Residual sulphur levels after hydrodesulfurization treatment with the catalyst typically range from below about 30, preferably below about 20, more preferably below 10 and most preferably below about 5 ppmwt. The residual nitrogen levels are even lower, preferably below about 15, more preferably below about 10, even more preferably below about 5 and most preferably below about 3 ppmwt. For achieving residual sulphur levels below about 10 and residual nitrogen levels below about 3 ppmwt, preferably higher hydroprocessing pressures are used of preferably above about 20, more preferably above about 30 and most preferably above about 40 bar.

In another embodiment, the catalyst comprises at least 60 wt % bulk metal oxidic particles.

The catalyst can optionally contain less than 10 mole % of a second Group VIB metal (relative to the total amount of Group VIB metals), and can optionally further contain less than 10 mole % (relative to the total of the Group VIB metals) of a Group V metal.

In an embodiment, the process further comprises forming a vapor product containing at least one of sulfur and nitrogen. In a related embodiment, the vapor product is separated from the hydrocarbon product and the vapor product is conducted away from the process.

In an embodiment, the catalytic conversion conditions are hydrotreating conditions effective for converting at least a portion of organically bound sulfur and organically bound nitrogen into hydrogen sulfide and ammonia respectively. In a related embodiment, the process further comprises at least one of (i) hydrocracking and (ii) hydrogenating the hydrocarbon product.

In an embodiment, the hydrocarbon product is removed from the process for storage and/or further processing. For example, the liquid product, depending on product boiling range, is useful as (i) a fuel oil, such as a diesel oil or (ii) a lubricating oil such as a lubricating oil basestock.

DETAILED DESCRIPTION OF THE INSTANT INVENTION

The invention will be described as follows: a first section will describe catalytic hydroprocessing, a second section will describe the bulk bimetallic hydroprocessing catalyst, a third section will describe methods for making the bulk multimetallic catalyst, and a fourth section will contain examples.

Section I—Catalytic Hydroprocessing

The present invention involves hydroprocessing a hydrocarbon feed by a process comprising contacting the feed with hydrogen in the presence of a catalytically effective amount of a bulk catalyst under catalyst conversion conditions, the bulk catalyst comprising a Group VIII metal and a Group VIB metal. In an embodiment, the Group VIB metal component is selected from molybdenum, tungsten, and mixtures thereof, and the Group VIII metal component is selected from nickel, cobalt, iron, and mixtures thereof. The metal components (calculated as oxides) of the bulk metal catalysts comprise at least 60 wt % of the catalyst. The catalyst is not amorphous, i.e., the catalyst exhibits at least some crystallinity as evidenced by X-Ray diffraction, for example.

It has been discovered that such a catalyst is effective for the removal of nitrogen and sulfur from a hydrocarbon feed, and is particularly effective for hydroprocessing feeds containing both nitrogen and sulfur. The contacting of the hydrocarbonaceous feedstream with the bulk metal hydroprocessing catalyst occurs in the presence of a hydrogen-containing treat gas, and the reaction stage is operated under effective hydroprocessing conditions. The contacting of the hydrocarbonaceous feedstream with the bulk metal hydroprocessing catalyst produces at least a liquid hydrocarbon product having less nitrogen, sulfur, or both compared to the feed.

The hydrocarbon feed is a material comprising hydrogen and carbon that is obtained or derived from crude petroleum oil, from tar sands, from coal liquefaction, shale oil and hydrocarbon synthesis. Hydrocarbon feeds include feeds boiling from the naphtha boiling range to heavy feedstocks, such as gas oils and resids, and also those derived from Fischer-Tropsch processes. Typically, the feed boiling range will be from about 40° C. to about 1000° C. Non-limiting examples of suitable feedstreams include vacuum gas oils; distillates including naphtha, diesel, kerosene, and jet fuel; heavy gas oils, raffinates, lube oils, cycle oils, waxy oils, and the like.

Hydrocarbon feeds generally contain contaminants such as nitrogen and sulfur, often in organically-bound form. Feed nitrogen content can range from about 50 wppm to about 5000 wppm nitrogen, based on the weight of the feed, or about 75 wppm to about 800 wppm nitrogen, or about 100 wppm to about 700 wppm nitrogen. The nitrogen appears as both basic and non-basic nitrogen species. Examples of basic nitrogen species include quinolines and substituted quinolines, and examples of non-basic nitrogen species may include carbazoles and substituted carbazoles.

Feed sulfur content generally ranges from about 50 wppm to about 5 wt %, based on the weight of the feed, or from about 100 wppm to about 5000 wppm, or from about 100 wppm to about 3000 wppm. Feeds subjected to prior processing such as separation, extraction, hydroprocessing, etc., may have significantly less sulfur, for example in the range of 75 wppm to 500 wppm. Feed sulfur will usually be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene, tetrahydrothiophene, benzothiophene and their higher homologs and analogs. The feed can also contain olefinic and aromatic hydrocarbon, with aromatics being typically present in an amount ranging from about 0.05 wt %, to about 50 wt %, based on the weight of the feed.

In an embodiment, the invention relates to contacting the feed with hydrogen in the presence of the catalyst under catalytic hydroprocessing conditions. The hydrogen may be in the form of a hydrogen-containing treat gas. The term "hydroprocessing" means a catalytic process conducted in the presence of hydrogen. The term includes processes such as the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of unsaturated hydrocarbon; the hydroisomerization and/or catalytic dewaxing of waxes, particularly Fischer-Tropsch waxes; demetallation of heavy hydrocarbons, and ring-opening. Thus, "effective hydroprocessing conditions" are to be considered those conditions that when selected achieve the desired result of the hydroprocessing process. For example, effective hydroisomerization and/or catalytic dewaxing conditions are to be considered those conditions that, when selected, achieve the desired degree of dewaxing to produce the desired product.

In a preferred embodiment, the effective hydroprocessing conditions are effective hydrotreating conditions, i.e., conditions effective for at least one of (i) hydrogenation or (ii) hydrogenolysis. Generally, hydrotreating conditions will result in removing at least a portion of the heteroatoms in the feed and in hydrogenating at least a portion of the aromatics in the feed. Hydrotreating conditions typically include temperatures ranging from about 100° C. to about 450° C., preferably about 200° C. to about 370° C., more preferably about 230° C. to about 350° C. Typical weight hourly space velocities ("WHSV") range from about 0.05 to about 20 $hr^{-1}$, preferably from about 0.5 to about 5 $hr^{-1}$. Any effective pressure can be utilized, and pressures typically range from about 5 to about 250 bar. Hydrogen ($H_2$) to oil ratio generally ranges from about 5 to about 2000 NL/L. Process conditions may vary, as is known to those skilled in the art, depending on the feed boiling range and speciation. Generally, as the boiling point of the feed increases, the severity of the conditions will also increase. The following table serves to illustrate typical conditions for a range of feeds.

| FEED | TYPICAL BOILING RANGE ° C. | TEMP. ° C. | PRESS, BAR | SPACE VELOCITY V/V/HR | $H_2$ GAS RATE SCF/B |
|---|---|---|---|---|---|
| Naphtha | 25-210 | 100-370 | 10-60 | 0.5-10 | 100-2,000 |
| Diesel | 170-350 | 200-400 | 15-110 | 0.5-4 | 500-6,000 |
| Heavy Gas Oil | 325-475 | 260-430 | 15-170 | 0.3-2 | 1000-6,000 |
| Lube Oil | 290-550 | 200-450 | 6-210 | 0.2-5 | 100-10,000 |
| Resid | 10-50% > 575 | 340-450 | 65-1100 | 0.1-1 | 2,000-10,000 |

The process uses hydrogen or a hydrogen-containing treat gas. Treat gas can comprise substantially pure hydrogen or can be mixtures of other components typically found in refinery hydrogen streams. It is preferred that the treat gas contain little, more preferably no, hydrogen sulfide. The treat gas purity should be at least about 50% by volume hydrogen, preferably at least about 75% by volume hydrogen, and more preferably at least about 90% by volume hydrogen. The treat gas can be pure or substantially pure hydrogen.

The hydroprocessing occurs in a reaction stage. The reaction stage can comprise one or more reactors or reaction zones each of which comprises one or more catalyst beds of the same or different catalyst. At least one bed will contain the bulk bimetallic catalyst. Although other types of catalyst beds/reactors can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed. A portion of the heat generated during hydroprocessing can be recovered. Where this heat recovery option is not available, conventional cooling may be performed through cooling utilities such as cooling water or air, or through use of a hydrogen quench stream. In this manner, optimum reaction temperatures can be more easily maintained.

Section II—Bulk Bimetallic Catalysts

In an embodiment, the invention relates to hydroprocessing a hydrocarbon feed using a bulk bimetallic catalyst. The trimetallic bulk catalysts of the prior art have a higher activity in hydrodesulfurization compared to the bimetallic bulk catalysts of the prior art, but have the disadvantage over bimetallic catalysts that, because of the presence of two different group VIB metal compounds, the production process is more complicated. A further distinct disadvantage of the trimetallic catalysts over bimetallic catalyst is that it is more difficult to reclaim the metals from the spent (or used or partially used) catalysts, because it is difficult to separate two different group VIB metals with a high yield. By way of comparison, the bulk catalyst of the present invention can be made by methods at least as straightforward as those of the prior art multimetallic catalysts (if not more so). Moreover, recycling of the constituent metals is easier. The catalyst has a high hydrodesulfurization and hydrodenitrogenation activity and is able to reach very low levels of residual sulfur in the product. It was surprisingly found that the catalyst has a very high hydrodesulfurization activity, which is close to or even better than comparable trimetallic catalysts, particularly in the presence of feed nitrogen. In view of the relatively low activities (as measured in the DBT test) of the nickel tungsten catalyst of comparative example B disclosed in WO 00/41810, it was surprising to find that a nickel-tungsten bulk catalyst made according to the process of the present invention has a very high activity and allows to reach very low sulfur levels in the hydroprocessing of a real nitrogen-containing and sulfur-containing feeds. Without wishing to be bound by any theory or model, the bulk catalyst of the invention appears to have a higher relative activity for nitrogen removal compared to its sulfur removal activity. The ultra-deep removal of nitrogen prevents the catalyst from poisoning by basic strongly adsorbing nitrogen compounds and prevents a reduction in desulfurization activity, which results in low product nitrogen and low product sulfur.

When the catalyst is a nickel-tungsten catalyst, hydrodesulfurization or ("HDS") activity is dependent on the hydroprocessing pressure. Consequently, the catalyst's advantageously high catalytic activity is even more pronounced at high pressure. Therefore, the catalyst is most advantageously used in a process for the hydrodesulfurization and hydrodenitrogenation pre-treatment of a hydrocracking feed stream, or in a process for the manufacture of a lubricating base oil.

In an embodiment, the non-amorphous bulk bimetallic catalyst comprises nickel tungsten metal oxidic particles. The following is a summary of one method for synthesizing the catalyst, which will be explained in more detail in the next section.

First, a slurry is formed of a first solid metal compound comprising a first solid metal compound comprising Group VIII metal and a second solid metal compound comprising Group VIB metal in suspension in a protic liquid. The slurry preferably further comprises less than 10 mole % of a second Group VIB metal (relative to the total amount of Group VIB metals) and also preferably further comprises less than 10 mole % of a Group V metal (relative to the total of the Group VIB metals) and optionally further comprises a second Group VIII metal. Most preferably, the slurry comprises only one Group VIII metal, advantageously nickel, only one Group VIB metal, advantageously tungsten, and less than 10 mole % of a Group V metal (relative to the Group VIB metal) in a protic liquid. Then, the catalyst is formed by reacting the first and second solid metal compounds at elevated temperature whereby the first and second solid metal compounds remain at least partly in the solid state during the entire reaction to form the nickel tungsten oxidic bulk catalyst.

In the embodiment where the bulk metal catalyst formed consists essentially of nickel tungsten metal oxidic particles, the nickel tungsten bulk catalyst is substantially bimetallic, that is substantially having only tungsten as the Group VIB metal and most preferably also having only nickel as the Group VIII metal. Although it is less preferred, the catalyst may contain other metals. The bulk catalyst may optionally further comprise less than 10 mole % of a second Group VIB metal (relative to the total amount of Group VIB metals). The bulk catalyst may optionally further comprise less than 10 mole % of a Group V metal (relative to the total of the Group VIB metals). In a preferred embodiment, the bulk catalyst comprises a Group V non-noble metal, preferably niobium, in an amount between 0.1 and 10 mole % (relative to the total of the Group VIB metals), more preferably between 0.1 and 9 mole %, conveniently between 0.1 and 8 mole %, such as between 0.1 and 7 mole % and even more preferably between 0.1 and 5 mole %. The Group V metal was found to increase the activity even when present in relatively low amounts. The bulk catalyst may optionally further comprise a second Group VIII metal, for example Cobalt. If so, the second Group VIII metal is preferably present in an amount less than 10 mole % (relative to the total of the Group VIII metals). It is most preferred that the bulk catalyst essentially comprises only nickel as Group VIII metal and only tungsten as Group VIB metal.

The instant bulk bimetallic catalysts are sensitive to heat treatment. Consequently, the bulk catalyst should be heat treated at a temperature below a temperature where transition to a fully-crystalline structure occurs. This applies to any and all heat treatment steps in the production process of the bulk catalyst prior to use in hydroprocessing. This applies in particular also to heat treatment of shaped bulk catalyst particles after compositing and shaping. Preferably, the bulk catalyst is heat treated below about 450° C., more preferably below about 400° C., even more preferably below about 375° C. and most preferably below about 350° C.

The Group VIII to Group VIB metal molar ratio of the bulk catalyst, e.g., the nickel to tungsten molar ratio, can in principle vary between wide ranges, for example between about 0.1 and about 5. Generally good results can be obtained with a metal molar ratio between about 0.2 and about 4. In this range, two different sub-ranges were distinguished. In the metal molar ratio range between about 0.2 and about 1, it can be more difficult to obtain an active bulk catalyst when the first and second metal compounds are reacted under atmospheric pressure conditions. In this molar metal ratio, and under atmospheric pressure conditions, the XRD pattern showed a large number of peaks, possibly due to some raw materials still present but mainly to crystal structures of unidentified inactive compounds.

It was surprisingly found that when the metal mole ratio is between about 0.2 and about 1, a good bulk catalyst (good and better in this context mean: a bulk catalyst with high or higher hydrodesulfurization activity) could be obtained when the reaction between the first and second metal compounds takes place under hydrothermal conditions at a pressure higher than 1 bar. In the preferred case where the protic liquid is water, hydrothermal conditions preferably mean that the synthesis mixtures is heated above about 100° C. in a sealed vessel under autogenous pressure. Where the protic liquid is different from water, hydrothermal conditions mean that the synthesis mixture is heated above the atmospheric boiling point of the protic liquid in a sealed vessel and under autogenous pressure. Preferably, with hydrothermal conditions, the metal molar ratio should be more than about 0.3, preferably more than about 0.4, more preferably more than about 0.5, even more preferably more than about 0.6 and most preferably more than about 0.7.

When the metal molar ratio is above about 1, it is not necessary (but still possible) to use hydrothermal conditions, so it is possible to make the catalysts both at hydrothermal and ambient pressure conditions. Provided the active form of the catalyst is formed under the conditions applied, catalysts obtained by the hydrothermal or atmospheric route are quite similar. It was also found that the activity of a bulk catalyst having a metal molar ratio of about 1 or more, preferably between about 1 and about 3 may be somewhat higher when the reaction between the first and second metal compounds takes place under hydrothermal conditions at a pressure higher than about 1 bar. Therefore, in one embodiment of the invention, the bulk catalyst according to the invention is produced in a process wherein the reaction in the first and second metal compounds takes place in hydrothermal conditions, in particular in a process wherein the protic liquid/solvent is water and the reaction is done under hydrothermal conditions at a reaction temperature above about 100° C. and a pressure higher than about 1 bar. The reaction is preferably done in an autoclave under autogenous pressure and temperatures between about 105° C. and about 180° C., such as between about 110° C. and about 170° C., more preferably between about 120° C. and about 160° C., even more preferably between about 140 and about 160° C. Hydrothermal conditions are advantageously applied with a metal molar ratio between about 0.2 and about 1.5, preferably between about 0.2 and about 1.3, more preferably between about 0.2 and about 1.2 and most preferably between about 0.2 and about 1.

From a process economy point of view it is more attractive to use atmospheric reaction conditions. Therefore, the preferred bulk catalyst according to the invention has a metal molar ratio between about 1 and about 4, more preferably between about 1 and about 2 and most preferably between about 1 and about 1.5, and is obtainable by a process wherein the reaction is done at substantially atmospheric pressure. Typically, the protic liquid is water and the reaction temperature under atmospheric conditions is below about 120° C., usually below about 100° C. The reaction is carried out at elevated temperature, preferably above about 50° C., more preferably above about 60° C., more preferably above about 70° C. and most preferably above about 80° C. It was further found that under atmospheric reaction conditions a bulk metal catalyst having higher catalytic activity can be obtained by choosing a metal molar ratio higher than about 1, preferably more than about 1.1, more preferably more than about 1.2, even more preferably more than about 1.3 and most preferably more than about 1.4. Too high metal molar ratios are however not preferred because that may result in incomplete reaction of the nickel compound during catalyst synthesis. In view of preventing that problem the metal molar ratio is preferably below about 2, more preferably below about 1.5.

The reaction time, both under hydrothermal and atmospheric reaction conditions, is chosen sufficiently long to substantially complete the reaction. The reaction is complete when the X-ray diffraction pattern of the separated metal oxidic particles does not show reflections of the unreacted starting compounds. Typically, the reaction is carried out for a time of at least 2 hours, preferably at least 4 hours, more preferably at least 6 hours and most preferably at least 8 hours. The bulk bimetallic catalyst of the invention has a metastable hexagonal structure having an X-ray diffraction pattern with a single reflection between about 60° and about 65° (diffraction angle 2θ) and main reflections between about 32° and about 36° 2θ and between about 50° and about 55° 2θ (using a copper anode). The X-ray powder diffraction pattern shows a close-packed hexagonal (cph) oxygen lattice with almost random distribution of nickel and tungsten over the octahedral cavities of the oxygen lattice wherein the a and b axes have a length conforming to the distance between two neighboring oxygen atoms in the same lattice in the cph structure and wherein the c axis has a length twice the distance between two successive layers in the cph structure. It is preferred that reflections of other crystalline compounds are substantially absent in the X-ray diffraction pattern, although an amorphous phase may also be present. While not wishing to be bound by any theory or model, the presence of the metastable hexagonal phase appears to be indicative of a high catalytic activity of the oxidic bulk catalyst. The crystalline structure of the metastable hexagonal NiWO4 phase in the preferred catalysts of the invention have lattice parameters a=2.92 Å, b=2.93 Å, and c=4.64 Å, all being +/−0.02 Å.

At high temperature, the hexagonal phase is transformed into "regular" orthorhombic $NiWO_4$, which can be identified by comparison with the standard powder diffraction database: JCPDS-ICDD PDF card 15-0755 or 72-1189 or 72-0480, where it is listed as "nickel tungstate oxide". The X-ray diffraction pattern of the bulk bimetallic catalyst prepared in accordance with the invention is generally similar to the X-ray diffraction pattern of the prior art trimetallic Ni/Mo/W bulk catalyst described in WO 00/41810, with the difference that the prior art diffraction pattern shows two peaks (doublet Q) between about 60° and about 65° 2θ and, the metastable hexagonal phase structure of the nickel tungsten catalyst of the invention shows a single reflection at about 63° to about 64°2θ.

As opposed to WO 2004/073859, which describes substantially amorphous NiMo bimetallic catalysts, it was observed that the high catalytic activity of the instant catalyst is associated with the presence of the metastable hexagonal phase. The catalyst of WO 2004/073859 is amorphous as shown by an X-ray diffraction pattern having no well-developed main reflections having a full width at half maximum [FWHM] of less than 2.5°.

In an embodiment, the catalyst is a nickel tungsten oxidic bulk catalyst. In a related embodiment, the first and the second solid metal compounds used in making the catalyst both remain at least partly in the solid state during the entire reaction to form the nickel tungsten oxidic bulk catalyst. The term "at least partly in the solid state" means that at least part of the metal compound is present as a solid metal compound and, optionally, another part of the metal compound is present as a solution of this metal compound in the protic liquid. This process is referred to as the solid-solid process and is described in WO 00/41810 as one of several possible preparation routes to prepare trimetallic bulk catalyst. The bimetallic catalysts described in comparative example B in WO 00/41810 was prepared in a process in which only the nickel compounds remained at least partly in the solid state during the entire reaction. It was found that this prior art solid-solute route resulted in significantly lower activities as exemplified in the examples hereafter described.

After the reaction step, the metal oxidic particles preferably have a median particle size in the range of at least about 0.5 μm, more preferably at least about 1 μm, most preferably at least about 2 μm, but preferably not more than about 5000 μm, more preferably not more than about 1000 μm, even more preferably not more than about 500 µm, and most preferably not more than about 150 µm. Even more preferably, the median particle diameter lies in the range of about 1 to about 150 µm and most preferably in the range of about 2 to about 150 µm. Preferably, the median particle size of the metal oxidic particles remains substantially unchanged in the bulk catalyst after compositing and shaping.

The bulk metal catalyst can be composited and shaped in combination with catalyst formulation agents. In such case, the catalyst particles comprise at least about 60 wt % of bulk metal oxidic particles (wt % calculated on the basis of metal oxides relative to the total weight of the bulk catalyst) as distinguished from supported catalysts that have metal oxides deposited on a support material in amounts significantly less than about 60 wt %. Preferably, the bulk catalyst comprises at least about 70 wt %, more preferably at least about 75 wt %, even more preferably at least about 80 wt % and most preferably at least about 85 wt % bulk metal oxidic particles, the remaining 0 to 40 wt % being one or more materials selected from the group of binder materials, conventional hydroprocessing catalysts and cracking compounds. Typically, after compositing of the bulk metal oxidic particles with a binder, the composition is shaped, preferably extruded, to form shaped bulk metal catalyst particles. The invention also relates to shaped bulk metal catalyst particles comprising the bulk metal oxidic particles. Accordingly, in one embodiment, the bulk metal catalyst is in the form of shaped particles, for example produced by extrusion of a composition comprising the metal oxidic particles and about 0 to about 40 wt % (relative to the total weight of the bulk metal catalyst) of an additional material, in particular a binder material. A bulk metal catalyst is further distinguished from a supported catalyst in that it does not comprise a preformed carrier material. The bulk metal catalyst is most preferably bimetallic, that is, substantially having only tungsten as the Group VIB metal and preferably also having only nickel as the Group VIII metal.

In an embodiment, the bulk catalyst, preferably after compositing and shaping, has a B.E.T. surface area of at least about 10 m$^2$/g, more preferably of at least 50 m$^2$/g, and most preferably of at least about 80 m$^2$/g, as measured via the B.E.T. method. The median pore diameter (50% of the pore volume is below said diameter, the other 50% above it) of the metal oxidic particles preferably is about 3 to about 25 nm, more preferably about 5 to about 15 nm (determined by $N_2$ adsorption). The total pore volume of the metal oxidic particles preferably is at least about 0.05 ml/g and more preferably at least about 0.1 ml/g, as determined by $N_2$ adsorption.

In an embodiment, the pore size distribution of the bulk catalyst, preferably after compositing and shaping, is approximately the same as that of conventional hydroprocessing catalysts. More in particular, the metal oxidic particles preferably have a median pore diameter of about 3 to about 25 nm, as determined by nitrogen adsorption, a pore volume of about 0.05 to about 5 ml/g, more preferably of about 0.1 to about 4 ml/g, still more preferably of about 0.1 to about 3 ml/g, and most preferably of about 0.1 to about 2 ml/g, as determined by nitrogen adsorption.

Generally, the bulk catalyst after compositing and shaping has a mechanical strength, expressed as side crush strength (SCS), of at least about 1 lbs/mm and preferably of at least about 3 lbs/mm (measured on extrudates with a diameter of about 1 to about 2 mm). The SCS of the bulk catalyst can be adequately increased by compositing the metal oxidic particles with a sufficient amount of binder.

To obtain catalyst compositions with high mechanical strength, it may be desirable for the catalyst composition of the invention to have a low macroporosity. Preferably, less than about 30% of the pore volume of the catalyst composition is in pores with a diameter higher than about 100 nm (determined by mercury intrusion, contact angle: about 130°), more preferably less than about 20%.

The invention also relates to a sulfided bulk metal catalyst comprising a bulk metal oxidic catalyst which has been sulfided. Generally, the median particle diameters of the metal sulfidic particles in the sulfided bulk metal catalyst are identical to those given above for the metal oxidic particles.

Section III—Making Bulk Bimetallic Catalysts

The invention further relates to a process for the manufacture of a bulk nickel tungsten oxidic catalyst comprising:
(i) forming a slurry of a first solid metal compound comprising Group VIII metal nickel and a second solid metal compound comprising Group VIB metal tungsten in a protic liquid, the slurry preferably further comprising less than 10 mole % of a second Group VIB metal (relative to the total amount of Group VIB metals) and also preferably further comprising less than 10 mole % of a Group V metal (relative to the total of the Group VIB metals), and
(ii) reacting the first and second solid metal compounds at elevated temperature and for a time sufficient to form bulk nickel tungsten oxidic particles whereby the first and second solid metal compounds remain at least partly in the solid state during the entire reaction to form the bulk nickel tungsten oxidic particles.

The process optionally further comprises one or more of the following process steps:
(iii) separating the bulk nickel tungsten oxidic particles from the slurry,
(iv) compositing the bulk nickel tungsten oxidic particles with 0 to 40 wt % (relative to the total weight of the bulk metal catalyst) of one or more materials selected from the group of binder materials, conventional hydroprocessing catalysts and cracking compounds before, during or after the combining and/or reacting of the metal compounds,
(v) spray-drying, (flash) drying, milling, kneading, slurry-mixing, dry or wet mixing, or combinations thereof,
(vi) shaping, and
(vii) drying and/or thermally treating at a temperature below a temperature where transition to a crystalline structure occurs, preferably below 350° C.

The solid-solid synthesis is described in detail, as one of the various different bulk metal catalyst manufacturing processes, in WO 00/41 810, which is herewith incorporated by reference.

Step (i)

The protic liquid to be applied in the process of the present invention can be any protic liquid. Examples are water, carboxylic acids, and alcohols such as methanol, ethanol or mixtures thereof. As the protic liquid in the process of the present invention, preferably a liquid, is used that comprises water, such as mixtures of an alcohol and water and more preferably water. Also different protic liquids can be applied simultaneously in the process of the invention. For instance, it is possible to add a suspension of a metal compound in ethanol to an aqueous suspension of another metal compound. Of course, a protic liquid must be chosen which does not interfere with the reaction. If the protic liquid is water, the solubility of the Group VIII non-noble metal compounds and Group VIB metal compounds which are at least partly in the solid state during the process of the invention generally is less than about 0.05 mol/(100 ml water at 18° C).

If the protic liquid is water, suitable nickel compounds which are at least partly in the solid state during the reaction comprise, and more preferably consist essentially of oxalates, citrates, carbonates, hydroxy-carbonates, hydroxides, molybdates, phosphates, tungstates, oxides, or mixtures thereof, with nickel hydroxy-carbonate, nickel hydroxide, nickel carbonate, or mixtures thereof being most preferred. Generally, the molar ratio between the hydroxy groups and the carbonate groups in the nickel hydroxy-carbonate lies in the range of 0 to 4, preferably 0 to 2, more preferably 0 to 1 and most preferably 0.1 to 0.8.

Suitable tungsten compounds, which are at least partly in the solid state during the process of the invention, comprise water-insoluble tungsten compounds, such as tungsten di- and trioxide, tungsten sulphide ($WS_2$ and $WS_3$), tungsten carbide, ortho-tungstic acid ($H_2WO_4*H_2O$), tungsten nitride, aluminum tungstate (also meta- or polytungstate), ammonium phosphotungstate, or mixtures thereof, with ortho-tungstic acid and tungsten di- and trioxide being preferred. Preferably, the reaction between the first and second metal compound is an acid/base reaction and the first or second metal compound is a basic solid and the other metal compound is an acidic solid compound.

In an embodiment, the first and second solid metal compound are free from nitrogen atoms and the protic liquid separated from the reacted metal oxidic particles in step iii) is re-used at least in part to form the slurry in step i). Most preferably, in this process the first metal compound is a nickel (hydroxy) carbonate and the second metal compound is tungstic oxide or acid.

This procedure is advantageous for several reasons. Apart from the fact that the metal compounds do not contain nitrogen atoms, also the reaction does not require addition of ammonia to the reaction mixture so the process is substantially free of nitrogen atoms. There is no accumulation of alien ions like ammonium and/or nitrate in the protic liquid on repeated recycling, and there is no need for washing the obtained separated oxidic particles. Moreover, there is a reduced loss of precious metals and less risk of undesirable ammonium nitrate salt formation. Further, because the catalyst is bimetallic, the chemistry in the reaction step is simpler, because there is only one group VIB metal. Consequently, there is less composition drift in the group VIB metals on recycling of the separated liquid after reaction. Because the compounds remain at least partly solid during the entire reaction the amount of metals dissolved in the protic liquid is small and hence losses are smaller. Furthermore, the spent bimetallic catalyst is easier to recycle to the constituent metals than the trimetallic catalyst because there is no need for the difficult separation of two group VIB metals. Conventional processes for the separation of nickel and tungsten can be used. This is advantageous in terms of reduced recycling process complexity, costs and increased metal recovery yield.

To obtain a final catalyst composition with high catalytic activity, it is preferred that the first and second solid metal compound(s) are porous metal compounds. For the first metal compound, preferably Ni hydroxy carbonate, the surface area (SA): SA>220 $m^2$/g, the pore volume pV>0.29 $cm^3$/g (measured by nitrogen adsorption), and the mean pore diameter MPD>3.8 nm (measured by nitrogen desorption), and for the second metal compound, preferably tungstic acid, SA>19 $m^2$/g, pV>0.04 $cm^3$/g (measured by nitrogen adsorption), and MPD>6.1 nm (measured by nitrogen desorption). It is desired that the total pore volume and the pore size distribution of these metal compounds are similar to those of conventional hydroprocessing catalysts. Preferably, the pore volume is about 0.05 to about 5 ml/g, preferably of about 0.05 to about 4 ml/g, more preferably of about 0.05 to about 3 ml/g, and most preferably about 0.05 to about 2 ml/g, as determined by mercury or water porosimetry. Further, the surface area preferably is at least about 10 $m^2$/g, more preferably of at least 20 $m^2$/g, and most preferably at least about 30 $m^2$/g, as determined via the B.E.T. method.

The median particle diameter of the first and second solid metal compound(s) preferably is in the range of at least 0.5 μm, more preferably at least 1 μm, most preferably at least 2μ, but preferably not more than 5000 μm, more preferably not more than 1000 μm, even more preferably not more than 500 μm, and most preferably not more than 150 μm. Even more preferably, the median particle diameter lies in the range of 1 to 150 μm and most preferably in the range of 2 to 150 μm. Generally, the smaller the particles size of the metal compounds, the higher their reactivity, though they can be difficult to handle in view of safety and environmental risks, and may need special precautions.

Step (ii)

During and/or after their addition, the slurry is kept at the reaction temperature and pressure for a certain (and sufficient) period of time to allow the reaction to take place. Generally, the slurry is kept at its natural pH during the reaction step. In particular, as opposed to WO 2004/073859, preferably no ammonium is added. The pH preferably is in the range of about 0 to about 12, more preferably in the range of about 3 to about 9, and even more preferably in the range of about 5 to about 8. As has been set out above, care must be taken that the pH and the temperature are chosen in such a way that the metals are not fully dissolved during the reaction step. The amount of protic liquid is not critical but, on the one hand, is conveniently chosen sufficiently high to get a slurry that can be stirred, and, on the other hand, is conveniently chosen sufficiently low to avoid the unnecessary creation of waste liquid.

The parameters that are important for the performance of the bulk catalysts, in particular the reaction temperature and pressure, the metal molar ratio of Group VIII to Group VIB metal, the hydrothermal reaction conditions and the reaction time are described above in more detail in the description of the bulk catalyst. As described above, when the metal molar ratio of Group VIII to Group VIB metal is between about 0.2 and about 1 and the protic liquid is water, the reaction is most conveniently done under hydrothermal conditions at a reaction temperature above about 100° C. and a pressure higher than about 1 bar. When the metal mole ratio is above about 1, the catalyst obtained can also be advantageously produced under hydrothermal conditions in order to be able achieve higher activity or to use lower nickel molar ratio or to react faster. However, in view of simplicity and the economics of the process itself, the bulk catalyst can be (and preferably is) manufactured in a process wherein the reaction is done at substantially atmospheric pressure and at temperature below about 120° C.

Step (iii)

After the reaction step, if necessary, the obtained metal oxidic particles can be separated from the liquid, e.g., via filtration or spray drying. In one alternative embodiment, such a small amount of protic liquid is used that no liquid needs to be separated from the solid reaction product. The wet reaction product can directly be shaped after optional compositing with additional material as defined below and then dried. For the separation of the metal oxidic particles in principle any solid-liquid separation technique can be used. The separation can be done before or after being composited with additional materials. After solid-liquid separation, optionally, a washing step can be included. Further, it is possible to thermally treat the bulk catalyst after an optional solid-liquid separation and drying step and prior to its being composited with the additional material.

Step (iv)

If so desired, an additional material selected from the group of binder materials, conventional hydroprocessing catalysts, cracking compounds, or mixtures thereof can be added during the above-described preparation of the bulk metal oxidic particles or to the bulk metal oxidic particles after their preparation. Preferably, this additional material is added to the slurry after the preparation of the bulk metal oxidic particles and prior to the separation step, but in any case prior to the shaping step. It is mostly added after the separation from the liquid in the mixing/kneading step. Examples of other additional materials that can be composited with the metal oxidic particles in the catalyst are described in WO 00/41810.

In all the above-described process alternatives, the term "compositing the bulk catalyst with a material" means that the material is added to the bulk catalyst or vice versa and the resulting composition is mixed. Mixing is preferably done in the presence of a liquid ("wet mixing"). This improves the mechanical strength of the final catalyst composition.

Compositing the metal oxidic particles with said additional material and/or incorporating the material during the preparation of the metal oxidic particles leads to bulk catalysts of particularly high mechanical strength, in particular if the median particle size of the metal oxidic particles is in the range of at least about 0.5 μm, more preferably at least about 1 μm, most preferably at least about 2 μm, but preferably not more than about 5000 μm, more preferably not more than about 1000 μm, even more preferably not more than about 500 μm, and most preferably not more than about 150 μm. Even more preferably, the median particle diameter lies in the range of about 1 to about 150 μm and most preferably in the range of about 2 to about 150 μm.

The compositing of the metal oxidic particles with the material results in metal oxidic particles embedded in this material or vice versa. Normally, the morphology of the metal oxidic particles is essentially maintained in the resulting bulk catalyst.

The binder materials to be applied may be any materials conventionally applied as binders in hydroprocessing catalysts. Examples are silica, silica-alumina, such as conventional silica-alumina, silica-coated alumina and alumina-coated silica, alumina such as (pseudo)boehmite, or gibbsite, titania, titania-coated alumina, zirconia, cationic clays or anionic clays such as saponite, bentonite, kaolin, sepiolite or hydrotalcite, or mixtures thereof. Preferred binders are silica, silica-alumina, alumina, titania, titania-coated alumina, zirconia, bentonite, or mixtures thereof. These binders may be applied as such or after peptization.

Step (v)

The slurry, optionally comprising any of the above additional materials can be subjected to spray-drying, (flash) drying, milling, kneading, slurry-mixing, dry or wet mixing, or combinations thereof, with a combination of wet mixing and kneading or slurry mixing and spray-drying being preferred. These techniques can be applied either before or after any of the above (further) materials are added (if at all), after solid-liquid separation, before or after a thermal treatment, and subsequent to re-wetting.

Step (vi)

If so desired, the metal oxidic particle optionally mixed with any of the above additional materials may be shaped optionally after step (ii) having been applied. Shaping comprises extrusion, pelletizing, beading and/or spray-drying. Any additives which are conventionally used to facilitate shaping can be added. These additives may comprise aluminium stearate, surfactants, graphite, starch, methyl cellulose, bentonite, polyethylene glycols, polyethylene oxides, or mixtures thereof. If the shaping comprises extrusion, beading and/or spray-drying, it is preferred that the shaping step is carried out in the presence of a liquid, such as water. Preferably, for extrusion and/or beading, the amount of liquid in the shaping mixture, expressed as loss of ignition (LOI), is in the range of about 20 to about 80%.

The bulk metal hydroprocessing catalysts used in the present invention can be formed into many different shapes. Non-limiting examples of suitable shapes include powders, spheres, cylinders, rings, and symmetric or asymmetric polylobes, for instance tri- and quadrulobes. Particles resulting from extrusion, beading or pelleting usually have a diameter in the range of about 0.2 to about 10 mm, and their length likewise is in the range of about 0.5 to about 20 mm. These particles are generally preferred. Powders, including those resulting from, e.g., spray-drying generally have a median particle diameter in the range of about 1 μm to about 100 μm, but deviations from this general range are possible.

Step (vii)

After an optional drying step, preferably above about 100° C., the resulting shaped catalyst composition may be thermally treated if desired. A thermal treatment, however, is not essential to the process of the invention. As described above, the bulk catalyst, has a temperature sensitive metastable hexagonal phase which readily transforms to a crystalline structure. Therefore, the metal oxidic particles are preferably heat treated at a temperature below a temperature where such transition to a crystalline structure occurs, preferably below about 450° C., more preferably below about 400° C., even more preferably below about 375° C., most preferably even below about 350° C. This thermal treatment is typically done on the final bulk catalysts after compositing and shaping. The heat treating time can vary from about 0.5 to about 48 hours and is done in an inert gas such as nitrogen, or in an oxygen-containing gas, such as air or pure oxygen. The thermal treatment can be carried out in the presence of water steam.

The bulk bimetallic catalyst is generally used in sulfided form. Catalyst sulfiding can be accomplished in any way effective for making the catalyst is sulfide form, including conventional sulfiding methods. For example, the catalyst can be contacted with one or more of the sulfur compounds, such as a sulfur-containing liquid. Such liquid may be the liquid form of a sulfur component. It may also be a solution of a sulfur compound. For elemental sulfur, it is possible to incorporate the sulfur into the catalyst via melting or sublimation. It is also possible to sulfide the product in the gaseous phase by contacting it with a sulfur-containing gas like $H_2S$. Finally, it is also possible to sulfide the catalyst by contacting it with a sulfur-containing hydrocarbon feed, e.g., a hydrocarbon feed that has been spiked with a sulfur-containing compound such as dimethyldisulfide (DMDS). Depending on the method used, sulfiding, i.e., contacting the catalyst with a sulfur-containing compound, can be carried out in situ and/or ex situ. Contacting the product with a gaseous sulfur component such as $H_2S$ can be done ex situ or in situ. Contacting the product with a sulfur-containing hydrocarbon feed is preferably done in situ. Contacting the catalyst with elemental sulfur or with a liquid or dissolved sulfur compound as described above will generally be done ex situ. In this case, it may be desired, however, to subject the sulfur-containing material to an activation step with hydrogen. The activation with hydrogen can be done ex situ or in situ. It should be noted that in the context of the present specification the indication in situ refers to a process carried out in the unit in which the catalyst will be eventually used in the hydroprocessing of hydrocarbon feeds. Conversely, ex situ refers to a process carried out not inside such unit. It is preferred that the catalyst composition is sulfided both ex situ and in situ.

In an embodiment, the following successive process steps are used to prepare the bulk catalyst: contacting and reacting the first and second compound in a slurry with protic liquid as described above, slurry mixing the obtained oxidic metal particles with, e.g., a binder, isolating the particles via filtration, wet mixing the filter cake with a material, such as a binder, kneading, extrusion, drying, calcining and sulfiding.

The catalysts are characterized using the following methods:

(A) Side Crush Strength Determination

First, the length of, e.g., an extrudate particle was measured, and then the extrudate particle was subjected to compressive loading (25 lbs in 8.6 sec.) by a movable piston. The force required to crush the particle was measured. The procedure was repeated with at least 40 extrudate particles and the average was calculated as force (lbs) per unit length (mm). The method preferably was applied to shaped particles with a length not exceeding 7 mm.

(B) Porosimetry

The $N_2$ adsorption measurement was carried out as described in: Paul A. Webb and Clyde Orr, "Analytical Methods in Fine Particle Technology", Micromeritics Instrument Corporation, Norcross, Ga., USA, 1977, ISBN 0-9656783-0-X. Where median pore diameter MPD is mentioned, we refer to the pore size distribution extracted from the desorption branch of the nitrogen sorption isotherm according to the BJH method as published: P. Barrett, L. G. Joyner, P. P. Halenda; The determination of pore volume and area distributions in porous substances. I. Computations from nitrogen isotherms, J. Am. Chem. Soc. (1951), 73, 373-380. Total surface area is determined by the BET method: S. Brunauer, P. H. Emmett and E. Teller, Adsorption of gases in multimolecular layers, J. Am. Chem. Soc. (1938), 60, 309-319.

Macropore volume determination, typically for pores having 60 nm or higher pore diameter, was carried out by mercury (Hg) porosimetry as described in e.g. Paul A. Webb and Clyde Orr, "Analytical Methods in Fine Particle Technology", Micromeritics Instrument Corporation, Norcross, Ga., USA, 1977, ISBN 0-9656783-0-X. The contact angle used was 140 degrees.

(C) Amount of Added Solid Metal Compounds

Qualitative Determination: The presence of solid metal compounds during the process of the invention can easily be detected by visual inspection at least if the metal compounds are present in the form of particles with a diameter larger than the wavelength of visible light. Of course, methods such as quasi-elastic light scattering (QELS) or near-forward scattering, which are known to the skilled person, can also be used to verify that at no point in time during the process of the invention all metals will be in the solute state. Median particle size was also determined with light scattering (near forward scattering).

Quantitative Determination: If the metal compounds which are added at least partly in the solid state are added as suspension(s), the amount of solid metal compounds added during the process of the invention can be determined by filtration of the suspension(s) to be added under the conditions which are applied during the addition (temperature, pH, pressure, amount of liquid), in such a way that all solid material contained in the suspension(s) is collected as solid filter cake. From the weight of the solid and dried filter cake, the weight of the solid metal compounds can be determined by standard techniques. Of course, if apart from solid metal compounds further solid compounds, such as a solid binder, are present in the filter cake, the weight of this solid and dried binder must be subtracted from the weight of the solid and dried filter cake. The amount of solid metal compounds in the filter cake can also be determined by standard techniques such as atomic absorption spectroscopy (AAS), XRF, wet chemical analysis, or ICP.

If the metal compounds which are added at least partly in the solid state are added in the wetted or dry state, a filtration generally is not possible. In this case, the weight of the solid metal compounds is considered equal to the weight of the corresponding initially employed metal compounds, on a dry basis. The total weight of all metal compounds is the amount of all metal compounds initially employed, on a dry basis, calculated as metal oxides.

(D) X-Ray Characteristic Full Width at Half Maximum

The characteristic full width at half maximum of the oxidic catalysts was determined on the basis of the X-ray diffraction pattern of the catalyst. The characteristic full width at half maximum is the full width at half maximum (in terms of $2\theta$ scattering angle) of the peak at $2\theta=53.6°$ ($\pm 0.7°$) and at $2\theta=35°$ ($\pm 0.7°$). For the determination of the X-ray diffraction pattern, a standard powder diffractometer (e.g., Philips PW1050) equipped with a graphite monochromator can be used. The measurement conditions can, e.g., be chosen as follows: X-ray generator settings: 40 kV and 40 mA; wavelength of 1.5418 angstroms; divergence and anti-scatter slits: v20 (variable); detector slit: 0.6 mm; step size: 0.05 (°$2\theta$); time/step: 2 seconds. As discussed, the bulk catalyst has at least in part a hexagonal structure characterized by an X-ray diffraction pattern having a single reflection between about 58 and about 65° two theta and main reflections near about 35 and about 53° two theta. The main reflections in the X-ray diffraction pattern have a full width at half maximum (FWHM) of less than about 2.5° two theta.

Section IV: Examples

The invention will be further illustrated by the Examples described below. R3 means a reaction process wherein both the first and second metal compounds are at least partly solid during the reaction. R2 means a reaction route wherein either the first or second metal compound is at least partly solid during the reaction; if more than two metals are present in the synthesis mixture, the metals other than the first and second metal compounds can be either at least partly solid during the reaction or dissolved. R1 means a process wherein all metal components are dissolved in the suspension medium during the reaction. The reactions were performed under atmospheric conditions, except where HT is mentioned, meaning that catalyst synthesis was performed under hydrothermal conditions. CBD means compacted bulk density of the catalyst. The diesel hydroprocessing test results are given in Table 9 wherein RVA and RWA are relative volume activity and relative weight activity, respectively, based on the total catalyst amount loaded in the reactor. HDN is hydrodenitrogenation and HDS is hydrodesulfurization. The tests were performed using two different temperature and pressure conditions 1 and 2. The postfix 1 or 2 (for example in RWA1 and RWA2) refers to the test condition 1 and 2 respectively. The RWA HDN1 results are not shown because the nitrogen levels in the reaction product were all so low that the measurement is inaccurate and differences in catalytic activity between the samples are too small to identify differences between samples. Further, the residual nitrogen and sulfur levels after the hydrotreatment were determined and given in Table 9 under column S1, S2 and N1. In the tests different diesel test procedures were used indicated as D1, D2, D3, D4 and D5. The RWA/RVA values of the reference catalysts Ref 1, Ref 2 and Ref 3 obtained under testing conditions D1, D2, D3, D4 and D5, respectively were arbitrarily defined as 100. All other RWA/RVA values are calculated relative to these reference catalysts for each series of tests performed under the same conditions.

Reference Catalyst 1 (Ref 1: Ni1.5-Mo0.5-W0.5 R3 90° C.)

14.4 g of $MoO_3$ (0.1 mole Mo, ex. Aldrich) and 25.0 g of tungstic acid $H_2WO_4$ (0.1 mole W, ex. Aldrich) were slurried in 800 ml of water (suspension A) and heated to 90° C. 35.3 g of nickel hydroxycarbonate $2NiCO_3*3Ni(OH)_2*4 H_2O$ (0.3 mole of Ni, ex. Aldrich) were suspended in 200 ml of water and heated to 90° C. (suspension B). The nickel hydroxycarbonate used in this and the other examples had a B.E.T. surface area of 239 $m^2/g$. Suspension B was added to suspension A in 60 minutes, and the resulting mixture was maintained at 90° C. for a period of 16 hours (overnight) with continuous stirring. At the end of this time, the suspension was filtered. The yield was above 98% (based on the calculated weight of all metal components having been converted to their oxides). The obtained filter cake was wet-mixed with 2.5 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The catalyst was sulfided and tested using the procedure from Diesel test procedures D1 and D2.

EXAMPLE A

Ni1.5-Mo1 R2 90° C.

35.3 g of ammonium heptamolybdate $(NH_4)_6Mo_7O_{24}*4H_2O$ (0.2 mole Mo, ex. Aldrich) were dissolved in 800 ml water, giving a solution with a pH of about 5.2 at room temperature. The solution was subsequently heated to 90° C. (solution A). 35.3 g of nickel hydroxycarbonate $2NiCO_3*3Ni(OH)_2*4 H_2O$ (0.3 mole Ni, ex. Aldrich) were suspended in 200 ml of water, and this suspension was heated to 90° C. (suspension B). Then suspension B was added to solution A in 10 minutes, and the resulting suspension was maintained at 90° C. for a period of 16 hours with continuous stirring. The yield was about 85%. The obtained filter cake was extruded (with 10 wt % binder), dried, calcined and sulfided as described for Reference Catalyst R1 and tested using the procedure from Diesel test procedure D2.

EXAMPLE B

Ni1.5-W1 R2 90° C.

A catalyst was prepared as described in Example A, except that the only one Group VIB metal component used was tungsten: a catalyst was prepared as in Reference Example R1 using 49.2 g of ammonium metatungstate $(NH_4)_6H_2W_{12}O_{40}$ (0.2 mole W, ex. Strem Chemical) ) and 35.3 g of nickel hydroxycarbonate $2NiCO_3*3Ni(OH)_2*4 H_2O$ (0.3 mole Ni). The yield was about 97%, based on the calculated weight of all metal components having been converted to their oxides. The obtained filter cake was extruded (with 10 wt % binder), dried, calcined and sulfided as described for Reference Catalyst 1 and tested using the Diesel test procedure D2.

EXAMPLE C

Ni1.5-Mo1 R3 90° C.)

A catalyst was prepared as described in Reference Catalyst 1, except that only one Group VIB metal component was applied: a catalyst was prepared using 28.8 g of molybdenum trioxide (0.2 mole Mo, ex. Aldrich) and 35.3 g of nickel hydroxycarbonate $2NiCO_3*3Ni(OH)_2*4 H_2O$ (0.3 mole Ni). The yield was about 98%, based on the calculated weight of all metal components having been converted to their oxides. The obtained filter cake was extruded (with 2.5 wt % binder), dried, calcined and sulfided as described for Reference Catalyst 1 and tested using the Diesel test procedure D1.

Reference Catalyst 2 (Ref 2: Ni1-Mo0.5-W0.5 R3 90° C.)

A catalyst was prepared as described for Reference Catalyst 1 except that lower amount of Ni was used. The catalyst was prepared using 14.4 g of $MoO_3$ (0.1 mole Mo, ex. Aldrich), 25.0 g of tungstic acid $H_2WO_4$ (0.1 mole W, ex. Aldrich) and 23.5 g of nickel hydroxycarbonate $2NiCO_3*3Ni(OH)_2*4 H_2O$ (0.2 mole of Ni, ex. Aldrich). The yield was above 98%. The obtained filter cake was dried overnight at 120° C. The obtained filter cake was wet-mixed with 10 wt % binder, extruded, dried, calcined and sulfided as described in Reference Example R1 and tested using Diesel test procedures D3 and D4.

EXAMPLE D

Ni1.5-W1 R3 90° C.

A catalyst was prepared as described for Catalyst Example 1, except that only one Group VIB metal component was used: a catalyst was prepared using 50.0 g of tungstic acid (0.2 mole W, ex. Aldrich) and 35.3 g of nickel hydroxycarbonate 2 $NiCO_3*3Ni(OH)_2*4 H_2O$ (0.3 mole Ni). The yield was about 99%, based on the calculated weight of all metal components having been converted to their oxides. The obtained filter cake was extruded (with 2.5 wt % binder), dried, calcined and sulfided as described in Reference Example R1 and tested using Diesel test procedure D1.

EXAMPLE E

Ni0.75-W1 R3 HT 150° C.

A catalyst having a Ni/W molar ratio of 0.75 to 1 was prepared in a manner analogous to what is described for Reference Catalyst 2, except that the reaction was carried out under autogenic pressure in an autoclave at a reaction temperature of 150° C. and that the reaction time was about 6 hours. 1.76 g of Ni carbonate (0.015 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then sulfided and tested using the procedure from Diesel test procedure D3.

EXAMPLE F

Ni1-W1 R3 HT 150° C.

A catalyst was prepared as described in Example D, except that the Ni/W molar ratio was 1 to 1 and that the reaction was carried out under autogenic pressure in an autoclave at a reaction temperature of 150° C. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then sulfided and tested using the procedure from Diesel test procedure D3.

EXAMPLE G

Ni0.5-W1 R3 HT 150° C.

A catalyst was prepared as described in Example D, except that the Ni/W molar ratio was 0.5 to 1. 1.17 g of Ni carbonate (0.01 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was wet-mixed with 10 wt % binder, extruded, dried, calcined and sulfided as described in Reference Example 1 and tested using Diesel test procedure D4.

EXAMPLE H

Ni0.5-W0.975-Nb0.025 R3 HT 150° C.

A catalyst was prepared as described in Example G, except that niobium was added and that that the Ni to W to Nb molar ratio was 0.5 to 0.975 to 0.025. 1.17 g of Ni carbonate (0.01 moles Ni) was added to 100 cc of water along with 4.87 grams of tungstic acid (0.0195 mole W) and 0.08g of niobic acid (0.0005 moles Nb) (ex. CBBM Industries). The suspension was put into a sealed Weflon™ vessel of 275 cc total volume and heated at 10° C/min to 150° C. and held at that temperature for 6 hours with continuous stirring. The sample was cooled to room temperature and the solid filtered and dried overnight at 120° C. The obtained material was extruded (with 10 wt % binder), dried, calcined and sulfided as described in Reference Example 1 and tested using Diesel test procedure D4.

EXAMPLE I

Ni1-Mo0.5-W0.5 R3 HT 150° C.

A catalyst was prepared with Ni to Mo to W molar ratio 1 to 0.5 to 0.5. 2.35 g of Ni carbonate (0.02 moles Ni) was added to 100 cc of water along with 2.5 grams of tungstic acid (0.01 mole W) and 1.44 g of $MoO_3$ (0.01 mole Mo). The suspension was put into a sealed Weflon™ vessel of 275 cc total volume and heated at 10° C./min to 150° C. and held at that temperature under autogenic pressure for 6 hours with continuous stirring. The sample was cooled to room temperature and the solid filtered and dried overnight at 120° C. The obtained material was pelleted, the pellets were crushed and 40-60 mesh fraction was isolated by sieving. The catalyst was sulphided and tested using the Diesel test procedure D3.

Reference Catalyst 3 (Ref 3: Ni1-W0.5-Mo0.5 R3 95° C.

188 g of nickel hydroxycarbonate $2NiCO_3 \cdot 3Ni(OH)_2 \cdot 4H_2O$ (1.6 mole of Ni) were suspended in 8000 ml of water and the resulting slurry was heated to 60° C. Subsequently 115.2 of $MoO_3$ (0.8 mole Mo) and 200 g of tungstic acid $H_2WO_4$ (0.8 mole W) were added and the resulting slurry was heated to 95° C. and maintained at that temperature for a period of about 24 hours with continuous stirring. At the end of this time, the suspension was filtered. The obtained filter cake was wet-mixed with 10 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The extrudates were crushed and 40-60 mesh fraction was isolated by sieving. The material was then sulphided and tested using the Diesel test procedure D5.

EXAMPLE J

Ni1-W1 R3 90° C.

50.0 g of tungstic acid $H_2WO_4$ (0.2 mole W) was slurried in one liter of water together with 23.5 g of nickel hydroxycarbonate $2NiCO_3 \cdot 3Ni(OH)_2 \cdot 4 H_2O$ (0.2 mole of Ni). The suspension of the 2 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5.

EXAMPLE K

Ni1-W1 R3 HT 125° C.

The catalyst was prepared under autogenic pressure in an autoclave reactor heated with microwave radiation at a reaction temperature of 125° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 10° C./min to 125° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE L

Ni1-W1 R3 HT 90° C.

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 10° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE M

Ni1-W1 R3 HT 175° C.

The catalyst was prepared under autogenic pressure in an autoclave reactor heated with microwave radiation at a reaction temperature of 175° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated at 10° C./min to 175° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE N

Ni1-W0.975-Nb0.025 R3 90° C.

48.7 g of tungstic acid $H_2WO_4$ (0.195 mole W) was slurried in one liter of water together with 23.5 g of nickel hydroxy-carbonate $2NiCO_3*3Ni(OH)_2*4 H_2O$ (0.2 mole of Ni) and 0.8 grams of niobic acid (0.005 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5.

EXAMPLE O

Ni1-W0.95-Nb0.05 R3 90° C.

47.4 g of tungstic acid $H_2WO_4$ (0.19 mole W) was slurried in one liter of water together with 23.5 g of nickel hydroxy-carbonate $2NiCO_3*3Ni(OH)_2*4 H_2O$ (0.2 mole of Ni) and 1.6 grams of niobic acid (0.01 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5.

EXAMPLE P

Ni1 W0.925 Nb0.075 R3 90° C.

46.2 g of tungstic acid $H_2WO_4$ (0.185 mole W) was slurried in one liter of water together with 23.5 g of nickel hydroxy-carbonate $2NiCO_3*3Ni(OH)_2*4 H_2O$ (0.2 mole of Ni) and 2.4 grams of niobic acid (0.015 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5.

EXAMPLE Q

Ni1W0.975 Nb0.025 HT 150° C.

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.87 grams of tungstic acid (0.0195 mole W) and 0.080 grams of niobic acid (0.0005 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE R

Ni1-W0.95 Nb0.05 R3 HT 150° C.

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.74 grams of tungstic acid (0.019 mole W) and 0.16 grams of niobic acid (0.001 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE S

Ni1-W0.925-Nb0.075 R3 HT 150° C.

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.62 grams of tungstic acid (0.0185 mole W) and 0.24 grams of niobic acid (0.0015 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE T

Ni1-W1 R3 90° C. 7 Days 50.0 g of tungstic acid $H_2WO_4$ (0.2 mole W) was slurried in one liter of water together with 23.5 g of nickel hydroxycarbonate $2NiCO_3*3Ni(OH)_2*4 H_2O$ (0.2 mole of Ni). The suspension of the 2 solids was heated to 90° C. and held at that temperature for a period of 7 days with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5.

EXAMPLE U

Ni1.5-W1 R3 HT 150° C.

The catalyst was prepared under autogenic pressure in an autoclave reactor heated with microwave radiation at a reaction temperature of 150° C. and reaction time of about 6 hours. 3.53 g of Ni carbonate (0.03 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE V

Ni0.9-W1 R1 90° C.

49.2 g of ammonium metatungstate (0.2 mole W) were dissolved in 800 ml of water giving a solution of a pH of about 5.2. To this solution, 0.4 moles of ammonium hydroxide (ca. 30 ml) was added, resulting in a pH increase to about 9.8. This solution was heated to 90° C. (solution A). A second solution was prepared by dissolving 52.4 g Ni nitrate hexahydrate (0.18 mole Ni) in 50 ml of water. The solution was maintained at 90° C. (solution B). Solution B was added dropwise to solution A at a rate of 7 ml/min. The suspension that formed was stirred for 30 minutes while the temperature was maintained at 90° C. The material was filtered hot and dried in air at 120° C. overnight. The obtained material was pelleted, the pellets were crushed and 40-60 mesh fraction was isolated by sieving. The material was then calcined at 300° C. for 1 hour; The material was then sulphided and tested using the Diesel test procedure D5.

EXAMPLE W

Ni0.9-W1 R1 HT 150° C.

The catalyst was prepared under autogenic pressure in an autoclave reactor heated with microwave radiation at a reaction temperature of 150° C. and reaction time of 30 minutes. To a solution of 10.48 g Ni nitrate hexahydrate (0.036 mole Ni) in 100 cc of water was added 9.86 g of ammonium metatungstate (0.04 mole W) and ca. 6 ml of ammonium hydroxide solution (0.08 mole NH4OH). The suspension was put into a sealed Weflon™ vessel of 275 cc total volume and heated at 10° C./min to 150° C. and held at that temperature for 30 minutes with continuous stirring. The sample was cooled to room temperature and the solid filtered, washed and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE X

Ni1-W1 R2 90° C.

49.2 g of ammonium metatungstate $(NH_4)_6H_2W_{12}O_{40}$ (0.2 mole W) were dissolved in 800 ml water, giving a solution with a pH of about 5.2 at room temperature. The solution was subsequently heated to 90° C. (solution A). 23.5 g of nickel hydroxycarbonate $2NiCO_3*3Ni(OH)_2*4 H_2O$ (0.2 mole Ni) were suspended in 200 ml of water, and this suspension was heated to 90° C. (suspension B). Then suspension B was added to solution A in 10 minutes, and the resulting suspension was maintained at 90° C. for a period of 16 hours with continuous stirring. The resulting solid was dried at 120° C. for 16 hours (overnight). The resulting solid was pelleted, the pellets were crushed and 40-60 mesh fraction was isolated by sieving. The material was then sulphided and tested using the Diesel test procedure D5.

EXAMPLE Y

Ni1-W1 R2 HT 150° C.

The catalyst was prepared under autogenic pressure in an autoclave reactor heated with microwave radiation at a reaction temperature of 150° C. and reaction time of about 6 hours. 3.52 g of Ni carbonate (0.03 moles Ni) was added to 100 cc of water along with 7.40 g of ammonium metatungstate (0.03 mole W). The suspension was put into a sealed Weflon™ vessel of 275 cc total volume and heated with microwave radiation at 10° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

Diesel Test Procedure D1

The catalysts were tested in a down-flow tubular reactor. Each reactor tube contained 10 ml of catalyst mixed with an equal amount of SiC particles and sandwiched between layers of SiC particles. Before being tested, the catalysts were pre-sulfided via liquid phase presulfiding using the feed described in Table 1 which had been spiked with dimethyl disulfide to a total sulfur content of 3.7 wt %. The presulfided catalysts were then tested in the hydrotreating of a diesel feedstock having the properties shown in Table 1.

TABLE 1

| | GAS OIL FEEDSTOCK |
|---|---|
| Sulfur content (% wt) | 1.24 |
| Nitrogen content (ppmwt) | 86 |
| Mono aromatics (% wt) | 16.5 |
| Di-aromatics (% wt) | 10.8 |
| Di+-aromatics (% wt) | 0.8 |
| Total aromatics (% wt) | 28.1 |
| Simulated Distillation ASTM-D 86 | |
| Initial Boiling Point | 184 |
| 5% Volume (° C.) | 218.6 |
| 10% Volume (° C.) | 231.1 |
| 20% Volume (° C.) | 250.9 |
| 30% Volume (° C.) | 264.8 |
| 40% Volume (° C.) | 276.4 |
| 50% Volume (° C.) | 286.8 |
| 60% Volume (° C.) | 298.1 |
| 70% Volume (° C.) | 309.7 |
| 80% Volume (° C.) | 324.7 |
| 90% Volume (° C.) | 345.3 |
| 95% Volume (° C.) | 360.3 |
| Final Boiling Point (° C.) | 373.8 |

The catalysts were tested under the two conditions shown in Table 2.

TABLE 2

| | Presulfiding | Condition 1 | Condition 2 |
|---|---|---|---|
| Temperature (° C.) | 315 | 320 | 340 |
| Pressure (bar) | 30 | 40 | 20 |
| H$_2$ to oil ratio (Nl/l) | 200 | 300 | 300 |
| LHSV (1/h) | 3.0 | 2.0 | 1.5 |

Diesel Test Procedure D2

The catalyst was loaded into the reactor in a manner analogous to what is described in D1. Before being tested, the catalysts were presulfided via liquid phase presulfiding using the feed described below in Table 3 which had been spiked with dimethyl disulfide to a total sulfur content of 3.7 wt %. The presulfided catalysts were then tested in the hydrotreating of a diesel feedstock having the properties shown in Table 3:

TABLE 3

| | GAS OIL FEEDSTOCK |
|---|---|
| Sulfur content (% wt) | 1.23 |
| Nitrogen content (ppmwt) | 85 |
| Mono aromatics (% wt) | 16.6 |
| Di-aromatics (% wt) | 11.1 |
| Di+-aromatics (% wt) | 0.7 |
| Total aromatics (% wt) | 28.4 |

TABLE 3-continued

| | GAS OIL FEEDSTOCK |
|---|---|
| Simulated Distillation ASTM-D 86 | |
| Initial Boiling Point | 180 |
| 5% Volume (° C.) | 220 |
| 10% Volume (° C.) | 233 |
| 20% Volume (° C.) | 250 |
| 30% Volume (° C.) | 262 |
| 40% Volume (° C.) | 273 |
| 50% Volume (° C.) | 284 |
| 60% Volume (° C.) | 295 |
| 70% Volume (° C.) | 307 |
| 80% Volume (° C.) | 321 |
| 90% Volume (° C.) | 341 |
| 95% Volume (° C.) | 345 |
| Final Boiling Point (° C.) | 354 |

The catalysts were tested under the two conditions shown in Table 4.

TABLE 4

| | Presulfiding | Condition 1 | Condition 2 |
|---|---|---|---|
| Temperature (° C.) | 315 | 315 | 340 |
| Pressure (bar) | 45 | 45 | 20 |
| H$_2$ to oil ratio (Nl/l) | 200 | 200 | 200 |
| LHSV (1/h) | 3.0 | 1.5 | 1.5 |

Diesel Test Procedure D3

The catalyst was loaded into the reactor in a manner analogous to what is described in D1. Before being tested, the catalysts were presulfided via liquid phase presulfiding using the feed described below in Table 5 which had been spiked with dimethyl disulfide to a total sulfur content of 3.7 wt %. The presulfided catalysts were then tested in the hydrotreating of a diesel feedstock having the properties shown in Table 5.

TABLE 5

| GAS OIL FEEDSTOCK | |
|---|---|
| S (wt %) | 1.2 |
| N (ppmwt) | 84 |
| total aromatics (wt %) | 27.8 |
| polynuclear aromatic (PNA) (wt %) | 11.7 |
| mono-aromatics (wt %) | 16.5 |
| di-aromatics (wt %) | 10.8 |
| tri+-aromatics (wt %) | 0.8 |
| Simulated distillation ASTM-D 86 | |
| Initial boiling point | 184° C. |
| 5 vol. % | 218° C. |
| 10 vol. % | 231° C. |
| 30 vol. % | 265° C. |
| 50 vol. % | 287° C. |
| 70 vol. % | 310° C. |
| 90 vol. % | 345° C. |
| Final boiling point | 374° C. |

The catalysts were tested under the two conditions shown in Table 6.

TABLE 6

| | Presulfiding | Condition 1 | Condition 2 |
|---|---|---|---|
| Temperature (° C.) | 320 | 330 | 340 |
| Pressure (bar) | 40 | 40 | 20 |

TABLE 6-continued

|  | Presulfiding | Condition 1 | Condition 2 |
|---|---|---|---|
| H₂ to oil ratio (Nl/l) | 300 | 300 | 300 |
| LHSV (1/h) | 3.00 | 2.00 | 1.50 |

Diesel Test Procedure D4

The catalysts were tested as described in D3, except for another space velocity in the 1$^{st}$ condition.

|  | Presulfiding | Condition 1 | Condition 2 |
|---|---|---|---|
| Temperature (° C.) | 320 | 330 | 340 |
| Pressure (bar) | 40 | 40 | 20 |
| H₂ to oil ratio (Nl/l) | 300 | 300 | 300 |
| LHSV (1/h) | 3.00 | 1.50 | 1.50 |

Diesel Test Procedure D5

The catalyst was loaded into the reactor in a manner analogous to what is described in D1. Before being tested the catalysts were presulphided via liquid phase presulphiding using LGO feed described below in Table 7 which had been spiked with dimethyl disulfide to a total sulfur content of 3.7 wt %. The presulphided catalysts were then tested in the hydrotreating of a diesel feedstock having the properties shown in Table 7:

TABLE 7

| GAS OIL FEEDSTOCK | |
|---|---|
| S (wt %) | 1.1969 |
| N (ppmwt) | 102 |
| total aromatics (wt %) | 28.3 |
| mono-aromatics (wt %) | 16.5 |
| di-aromatics (wt %) | 11.0 |
| tri+-aromatics (wt %) | 0.8 |
| Simulated distillation ASTM-D 86 | |
| Initial boiling point | 178.4° C. |
| 5 vol. % | 211° C. |
| 10 vol. % | 224° C. |
| 30 vol. % | 261° C. |
| 50 vol. % | 283° C. |
| 70 vol. % | 309° C. |
| 90 vol. % | 348° C. |
| Final boiling point | 372° C. |

The catalysts were tested under the two conditions shown in Table 8:

TABLE 8

|  | Presulfiding | Condition 1 | Condition 2 |
|---|---|---|---|
| Temperature (° C.) | 320 | 320 | 340 |
| Pressure (bar) | 45 | 45 | 20 |
| H2 to oil ratio (Nl/l) | 200 | 300 | 300 |
| LHSV (1/h) | 3.00 | 3.00 | 1.50 |

TABLE 9

TEST RESULTS

| Catalyst | Synthesis conditions | Test powder | test extrudates | CBD loaded | S1 ppm | S2 ppm | N2 Ppm | RVA HDS1 | RVA HDS2 | RVA HDN2 | RWA HDS1 | RWA HDS2 | RWA HDN2 |
|---|---|---|---|---|---|---|---|---|---|---|---|---|---|
| Ref 1 | Ni1.5Mo0.5W0.5R390 |  | D2 | 1.39 | 23 | 24 | 2 | 100 | 100 | 100 | 100 | 100 | 100 |
| A | Ni1.5Mo1R290 |  | D2 | 0.96 | 247 | 131 | 10 | 33 | 46 | 61 | 51 | 71 | 93 |
| B | Ni1.5W1R290 |  | D2 | 1.17 | 61 | 51 | 7 | 65 | 72 | 71 | 81 | 90 | 88 |
| C | Ni1.5Mo1R390 |  | D1 | 0.77 | 160 | 132 | 13 | 33 | 45 | 58 | 59 | 82 | 104 |
| Ref 1 | Ni1.5Mo0.5W0.5R390 |  | D1 | 1.39 | 13 | 23 | 3 | 100 | 100 | 100 | 100 | 100 | 100 |
| D | Ni1.5W1R390 |  | D1 | 1.4 | 6 | 28 | 5 | 140 | 92 | 88 | 139 | 92 | 87 |
| E | Ni0.75W1R3 HT 150 | D3 |  | 1.63 | 3 | 13 | 3 | 114 | 126 | 115 | 85 | 93 | 86 |
| F | Ni1W1R3 HT 150 | D3 |  | 1.73 | 3 | 8 | 2 | 113 | 155 | 130 | 79 | 108 | 91 |
| Ref 2 | Ni1Mo0.5W0.5R390 crushed | D3 |  | 1.21 | 4 | 21 | 5 | 100 | 100 | 100 | 100 | 100 | 100 |
| I | Ni1Mo0.5W0.5R3 HT 150 | D3 |  | 1.27 | 3 | 20 | 3 | 110 | 103 | 105 | 98 | 111 | 106 |
| G | Ni0.5W1R3 HT 150 |  | D4 | 1.09 | 9 | 93 | 17 | 90 | 78 | 75 | 100 | 87 | 82 |
| H | Ni0.5W0.975Nb0.025R3 HT 150 |  | D4 | 1.23 | 4 | 69 | 13 | 121 | 90 | 84 | 119 | 89 | 83 |
| Ref 2 | Ni1Mo0.5W0.5R3 90 |  | D4 | 1.17 | 9 | 75 | 12 | 100 | 100 | 100 | 100 | 100 | 100 |

| Catalyst | Synthesis conditions | test powder | CBD loaded | S1 ppm | S2 ppm | N2 Ppm | RVA HDS1 | RVA HDS2 | RVA HDN2 | RWA HDS1 | RWA HDS2 | RWA HDN2 |
|---|---|---|---|---|---|---|---|---|---|---|---|---|
| Ref 3 | Ni1Mo0.5W0.5R395 | D5 | 1.25 | 149 | 23 | 3.7 | 100 | 100 | 100 | 100 | 100 | 100 |
| J | Ni1W1R390 | D5 | 1.12 | 1591 | 206 | 29 | 26 | 36 | 31 | 44 | 38 | 46 |
| K | Ni1W1R3 HT 125 | D5 | 1.64 | 16 | 9 | 1.3 | 279 | 147 | 216 | 114 | 125 | 97 |
| L | Ni1W1R3 HT 150 | D5 | 1.72 | 9 | 9 | 1.4 | 347 | 151 | 259 | 113 | 130 | 97 |
| M | Ni1W1R3 HT 175 | D5 | 1.75 | 6 | 8 | 1.2 | 420 | 150 | 311 | 111 | 127 | 94 |
| N | Ni1W0.975Nb0.025R390 | D5 | 1.05 | 1256 | 148 | 21 | 31 | 42 | 36 | 50 | 47 | 56 |
| O | Ni1W0.95Nb0.05R390 | D5 | 1.16 | 679 | 50 | 9 | 45 | 70 | 51 | 80 | 72 | 82 |
| P | Ni1W0.925Nb0.075R390 | D5 | 1.12 | 884 | 74 | 13 | 38 | 59 | 44 | 68 | 62 | 72 |
| Q | Ni1W0.975Nb0.025R3 HT 150 | D5 | 1.67 | 5 | 9 | 1.4 | 456 | 149 | 363 | 118 | 129 | 103 |
| R | Ni1W0.95Nb0.05R3 HT 150 | D5 | 1.63 | 5 | 9 | 1.5 | 455 | 149 | 365 | 119 | 128 | 102 |
| S | Ni1W0.925Nb0.075R3 HT 150 | D5 | 1.72 | 9 | 11 | 1.3 | 346 | 137 | 270 | 106 | 133 | 103 |
| T | Ni1W1R390 7 days | D5 | 1.51 | 67 | 17 | 2.9 | 148 | 112 | 124 | 93 | 102 | 85 |

TABLE 9-continued

TEST RESULTS

| | | | | | | | | | | | |
|---|---|---|---|---|---|---|---|---|---|---|---|
| U | Ni1.5W1R3 HT 150 | D5 | 1.63 | 64 | 20 | 3.7 | 148 | 107 | 115 | 83 | 100 | 77 |
| V | Ni0.9W1R190 | D5 | 2.5 | 851 | 86 | 8.1 | 40 | 54 | 21 | 28 | 73 | 38 |
| W | Ni0.9W1R1 HT 150 | D5 | 1.92 | 15 | 14 | 2.3 | 287 | 119 | 192 | 79 | 109 | 73 |
| X | Ni1W1R290 | D5 | 1.79 | 422 | 51 | 6.9 | 60 | 68 | 41 | 47 | 78 | 54 |
| Y | Ni1W1R2 HT 150 | D5 | 1.6 | 110 | 23 | 3.3 | 118 | 97 | 94 | 77 | 99 | 79 |

The results obtained under Diesel test procedure D2 show that the trimetallic catalyst obtained by R3 is more active than the bimetallic catalysts prepared by R2.

The results obtained under Diesel test procedure D1 show that a nickel tungsten bimetallic catalyst obtained by R3 from a synthesis mixture containing a Ni to W mole ratio of 1.5 is more active than a nickel molybdenum bimetallic catalyst obtained by R3 from a synthesis mixture having a Ni to Mo mole ratio of 1.5 and is also more active than a trimetallic bulk metal catalyst obtained by R3.

The results obtained under Diesel test procedures D3 and D4 show that active bimetallic nickel tungsten catalysts with Ni to W mole ratios of less than 1 can be obtained by R3, using hydrothermal conditions.

The results obtained under Diesel test procedure D5 show that longer reaction times are necessary to obtain sufficiently active bimetallic catalysts under atmospheric synthesis conditions, from synthesis mixtures containing low Ni to W mole ratios, and that hydrothermal conditions are preferred to prepare such catalysts. The results obtained under Diesel test procedure D5 also show that small amounts of Nb in the synthesis mixture have a favorable effect on catalyst performance.

What is claimed is:

1. A bulk catalyst comprising nickel tungsten metal oxidic particles, wherein the bulk catalyst has been prepared by a process comprising
   (i) forming a slurry of a first solid metal compound comprising Group VIII metal nickel and a second solid metal compound comprising Group VIB metal tungsten in a protic liquid, the slurry further comprising less than about 10 mole % of a second Group VIE metal (relative to the total amount of Group VIB metals) and less than about 10 mole % of a Group V metal (relative to the total of the Group VIB metals),
   (ii) reacting the first and second solid metal compounds at elevated temperature and under conditions sufficient to form the nickel tungsten metal oxidic particles, whereby the first and second solid metal compounds remain at least partly in the solid state during the entire reaction, wherein the bulk catalyst has a metastable hexagonal structure having an X-ray diffraction pattern with a single reflection between 58 and 65° (diffraction angle 2θ) and main reflections between 32 and 36° and between 50 and 55°, and wherein the main reflections have a full width at half maximum (FWHM) of less than about 2.5°.

2. The bulk catalyst according to claim 1, which is heat treated at a temperature below a temperature where transition to a crystalline structure occurs.

3. The bulk catalyst according to claim 1 having a nickel to tungsten metal molar ratio between about 0.2 and about 2.

4. The bulk catalyst according to claim 1, wherein the protic liquid is water and the reaction is done under hydrothermal conditions at a reaction temperature above about 100° C. and a pressure higher than about 1 bar.

5. The bulk catalyst according to claim 4, wherein the metal molar ratio is between about 0.2 and about 1.5.

6. The bulk catalyst according to claim 5, wherein the metal molar ratio is between about 0.2 and about 1.

7. The bulk catalyst according to claim 1, wherein the metal molar ratio is between about 1 and about 2 and wherein the reaction is done at substantially atmospheric pressure.

8. The bulk catalyst according to claim 7, wherein the metal molar ratio is between about 1 and about 1.5.

9. The bulk catalyst according to claim 1, wherein the reaction is carried out for a time of at least about 2 hours.

10. The bulk catalyst according to claim 1, wherein the first compound is a nickel carbonate or hydroxy-carbonate having a surface area of at least about 150 m²/g.

11. The bulk catalyst according to claim 1, further comprising a Group V metal, wherein the amount of the Group V metal, relative to the total of the Group VIB metals, is between about 0.1 and about 10 mole %.

12. The bulk catalyst according to claim 11, wherein the Group V metal is niobium.

13. A sulphided bulk catalyst comprising a bulk catalyst according to claim 1 that has been sulphided.

14. A bulk catalyst comprising the nickel tungsten metal oxidic particles of claim 1 and a binder, wherein the bulk catalyst comprises at least about 60 wt % nickel tungsten metal oxidic particles.

15. A process for the manufacture of a bulk catalyst comprising nickel tungsten metal oxidic particles, the process comprising
   (i) forming a slurry of a first solid metal compound comprising Group VIII metal nickel and a second solid metal compound comprising Group VIB metal tungsten in a protic liquid, the slurry further comprising less than about 10 mole % of a second Group VIB metal (relative to the total amount of Group VIB metals) and less than about 10 mole % of a Group V metal (relative to the total of the Group VIB metals),
   (ii) reacting the first and second solid metal compounds at elevated temperature and under conditions sufficient to form the nickel tungsten metal oxidic particles, whereby the first and second solid metal compounds remain at least partly in the solid state during the entire reaction, wherein the bulk catalyst has a metastable hexagonal structure having an X-ray diffraction pattern with a single reflection between 58 and 65° (diffraction angle 2θ) and main reflections between 32 and 36° and between 50 and 55°, and wherein the main reflections have a full width at half maximum (FWHM) of less than about 2.5°.

16. The process of claim 15, further comprising one or more of the following process steps:
   (iii) separating the metal oxidic particles from the slurry;
   (iv) compositing with 0 to 40 wt % relative to the total weight of the bulk catalyst of one or more materials selected from the group of binder materials, conventional hydroprocessing catalysts and cracking compounds before, during or after the combining and/or reacting of the metal compounds;

(v) spray-drying, (flash) drying, milling, kneading, slurry-mixing, dry or wet mixing, or combinations thereof;

(vi) shaping;

(vii) drying and/or thermally treating at a temperature below a temperature where transition to a crystalline structure occurs, and (viii) sulfiding.

17. The process according to claim 15, wherein the Group VIII to Group VIB metal molar ratio is between about 0.2 and about 1.5, the protic diluent is water and the reaction is done under hydrothermal conditions at a reaction temperature above about 100° C. and a pressure higher than about 1 bar.

18. The process according to claim 15, wherein the reaction is done at substantially atmospheric pressure and at temperature below about 120° C. and wherein the metal molar ratio is between about 1 and about 1.5.

19. The process according to claim 15, wherein the reaction between the first and second metal compound is an acid/base reaction and wherein the first or second metal compound is a basic solid and the other metal compound is an acidic solid compound.

20. The process according to claim 19, wherein the first metal (group VIII) compound is a metal (hydroxy) carbonate and the second metal compound is a (group VI) metal oxide or acid.

21. The process according to claim 20, wherein the first and second solid metal compounds are free from nitrogen atoms and wherein the protic liquid separated from the reacted metal oxidic particles in step iii) is re-used at least in part to form the slurry in step i).

* * * * *